(12) United States Patent
Uberoy et al.

(10) Patent No.: US 10,541,842 B2
(45) Date of Patent: Jan. 21, 2020

(54) METHODS AND APPARATUS FOR ENHANCING VIRTUAL SWITCH CAPABILITIES IN A DIRECT-ACCESS CONFIGURED NETWORK INTERFACE CARD

(71) Applicant: ViaSat, Inc., Carlsbad, CA (US)

(72) Inventors: Pawan Uberoy, San Jose, CA (US); Somnath Mani, Santa Clara, CA (US)

(73) Assignee: ViaSat, Inc., Carlsbad, CA (US)

( * ) Notice: Subject to any disclaimer, the term of this patent is extended or adjusted under 35 U.S.C. 154(b) by 12 days.

(21) Appl. No.: 15/867,416

(22) Filed: Jan. 10, 2018

(65) Prior Publication Data

US 2019/0215200 A1   Jul. 11, 2019

(51) Int. Cl.
*H04L 25/49* (2006.01)
*G06F 13/40* (2006.01)
*H04L 12/46* (2006.01)
*G06F 9/455* (2018.01)

(52) U.S. Cl.
CPC ...... *H04L 25/4923* (2013.01); *G06F 9/45558* (2013.01); *G06F 13/4022* (2013.01); *H04L 12/4633* (2013.01); *H04L 12/4641* (2013.01); *G06F 2009/45583* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,806,025 B2 | 8/2014 | Hummel et al. | |
| 8,867,403 B2 | 10/2014 | Biswas et al. | |
| 9,008,085 B2 | 4/2015 | Kamble et al. | |
| 9,172,557 B2 | 10/2015 | Biswas et al. | |
| 9,197,551 B2 | 11/2015 | DeCusatis et al. | |
| 9,515,931 B2 | 12/2016 | DeCusatis et al. | |
| 9,565,189 B1 | 2/2017 | Gill et al. | |
| 9,577,927 B2 | 2/2017 | Hira et al. | |
| 2010/0223397 A1* | 9/2010 | Elzur | H04L 41/0213 709/235 |

(Continued)

OTHER PUBLICATIONS

Concurrent NIC Partitioning and SR-IOV, Journal, 2017, 4 pages, Cavium Inc. San Jose, CA USA.

(Continued)

*Primary Examiner* — Phirin Sam
(74) *Attorney, Agent, or Firm* — JW Law Group; James M. Wu

(57) ABSTRACT

A process and/or apparatus capable of facilitating network communication via a directly accessible network interface controller ("NIC") in a virtualized environment is disclosed. The process, in some embodiments, is able to receive a packet stream traveling from a virtual machine ("VM") to a direct-access configured NIC ("DCN"). After forwarding from an embedded switch ("eSwitch") of the DCN to a virtual switch ("vSwitch") residing in a hypervisor or VM monitor in accordance with at least a portion of content of the packet stream, a processed packet stream is generated by the hypervisor in response to the packet stream. The processed packet stream is subsequently transmitted from the vSwitch to the eSwitch for facilitating the processed packet stream to reach its destination.

22 Claims, 7 Drawing Sheets

(56) References Cited

U.S. PATENT DOCUMENTS

| | | | |
|---|---|---|---|
| 2011/0032944 A1* | 2/2011 | Elzur | H04L 49/602 370/395.53 |
| 2013/0124702 A1* | 5/2013 | Shah | G06F 16/23 709/221 |
| 2014/0059537 A1 | 2/2014 | Kamble et al. | |
| 2015/0139037 A1* | 5/2015 | Li | H04L 41/0886 370/255 |
| 2017/0177396 A1* | 6/2017 | Palermo | G06F 9/45558 |
| 2017/0289068 A1* | 10/2017 | Palermo | H04L 49/9047 |
| 2017/0374318 A1* | 12/2017 | Yang | H04L 65/80 |
| 2018/0034769 A1* | 2/2018 | Modi | H04L 45/122 |
| 2018/0295180 A1* | 10/2018 | Yang | H04L 65/80 |

OTHER PUBLICATIONS

Abhijit Aswath, Srinivas Thodati, Enhancing Scalability Through Network Interface Card Partitioning, journal, Apr. 2011, 6 pages, Broadcom].

Teemu Koponen et al., Network Virtualization in Multi-tenant Datacenters, Technical Report, 2013, 22 pages, TR-2013-0001E, VMware, International Computer Science Institute & UC Berkeley.

\* cited by examiner

METHODS AND APPARATUS FOR ENHANCING VIRTUAL SWITCH CAPABILITIES IN A DIRECT-ACCESS CONFIGURED NETWORK INTERFACE CARD

FIELD

The exemplary embodiment(s) of the present invention relates to communications network. More specifically, the disclosed embodiment(s) of the present application relates to communication to and/or from virtual machines ("VMs").

BACKGROUND

In today's modern computing world, more and more components are being virtualized in systems, networking, and/or clouds to save capital expenditure, such as private companies, public institutions, government agencies, individuals, and the like. To improve efficiency while conserving resources, entities are gradually allowing third party providers to maintain infrastructures for hosting subscribers' virtual as well as physical components. A network or cloud provider becomes viable when entities need to increase their computing capacity or new features without investing in substantial amount of new infrastructure, personnel, hardware and/or software.

To improve networking efficiency, some virtual machines ("VMs") are able to bypass VM controller or monitor such as hypervisor to directly interface external or remote devices via a directly accessible NIC (network interface card or network interface controller). A disadvantage of this bypassing approach, however, is that the processing capability of a conventional NIC is typically less powerful than the processing capacity of hypervisor (or the physical machine).

SUMMARY

Some embodiments of the present invention disclose a process and/or apparatus capable of facilitating network communication via a directly accessible network interface controller ("NIC") in a virtualized environment. The process, in some embodiments, are able to receive a packet stream traveling from a virtual machine ("VM") to a direct-access configured NIC ("DCN"). After forwarding from an embedded switch ("eSwitch") of the DCN to a virtual switch ("vSwitch") residing in a hypervisor or VM monitor in accordance with at least a portion of content of the packet stream, a processed packet stream is generated by the hypervisor in response to the packet stream. The processed packet stream is subsequently transmitted from the vSwitch to the eSwitch for facilitating the processed packet stream to reach its destination.

BRIEF DESCRIPTION OF THE DRAWINGS

Exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
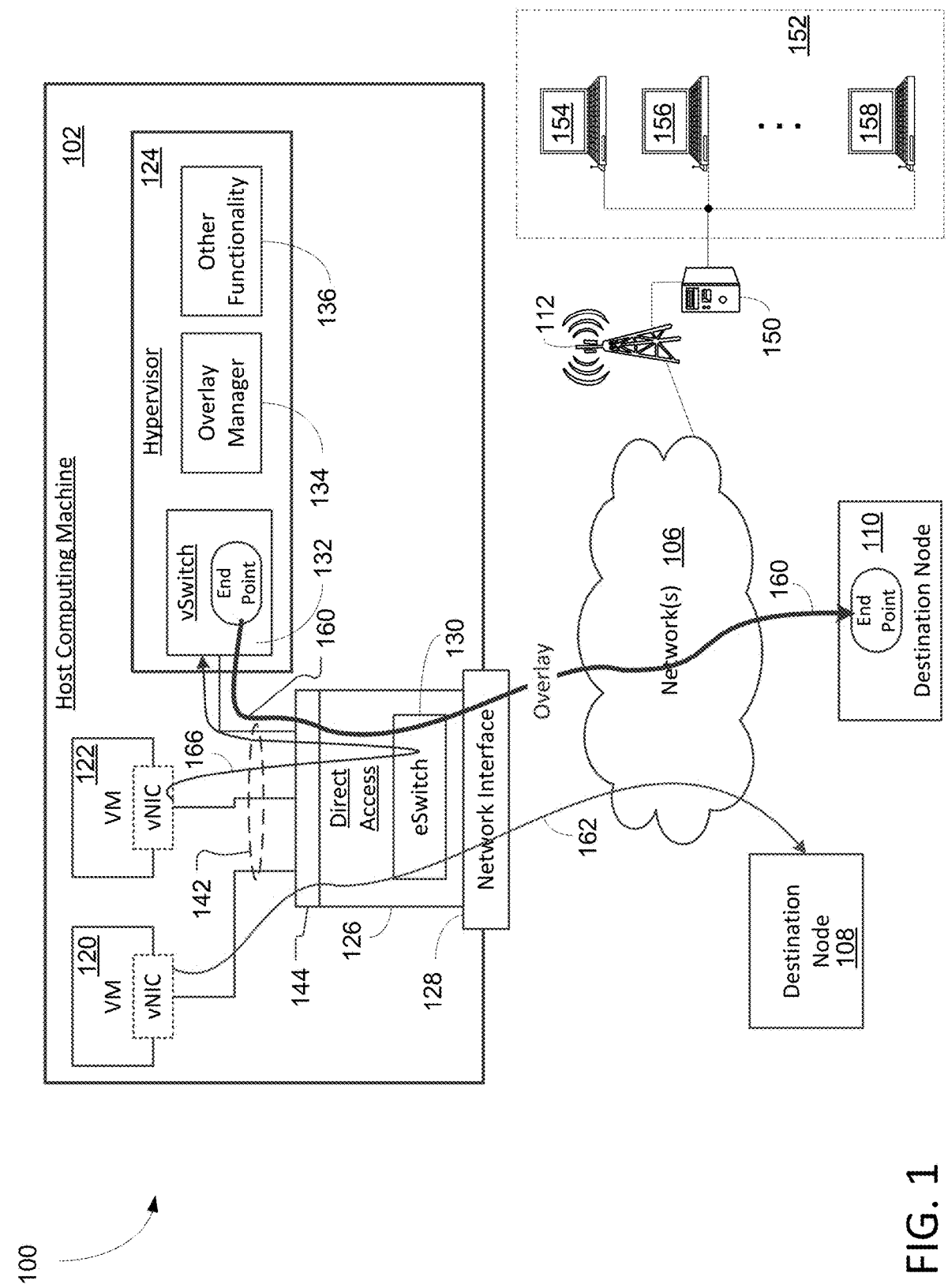
FIG. 1 is a block diagram illustrating an exemplary system containing various virtual machines ("VMs") capable of communicating with remote systems and nodes via virtual and/or physical network interface controllers or cards ("NICs") in accordance with some embodiments of the present invention.

Exemplary embodiment(s) of the present invention is described herein in the context of a method, device, and apparatus for providing network communication in a virtualized environment.

Those of ordinary skills in the art will realize that the following detailed description of the exemplary embodiment(s) is illustrative only and is not intended to be in any way limiting. Reference will now be made in detail to implementations of the exemplary embodiment(s) as illustrated in the accompanying drawings. The same reference indicators will be used throughout the drawings and the following detailed description to refer to the same or like parts. In the interest of clarity, not all of the routine features of the implementations described herein are shown and described.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

As used herein, "host computing machine" (sometimes referred to herein as simply a "host machine" or a "host") means a physical computing device such as a computer, server, or the like typically comprising a central processing unit (CPU), a main digital memory, and a network interface controller (NIC).

As user herein, "network interface controller" (NIC) refers to a component of a host computing machine that provides a connection to and from an external network. Network interface controller, as used herein, is generally synonymous with the terms network interface card, network adapter, and/or physical network interface.

As used herein, the term "hypervisor" is intended to include within its scope any meaning of that term as would be understood by a person of ordinary skill in the field. For example, the term "hypervisor," as used herein, is synonymous with the terms "virtual machine manager" and/or "virtual machine controller" and is intended to include within its scope both a bare metal hypervisor that runs directly on the hardware of the host machine and a hosted hypervisor that runs on an operating system of the host machine. In some embodiments of the invention, a hypervisor comprises software stored in a digital memory that, when executed on a host computing machine (e.g., the CPU), causes the host machine to create, host, and/or manage multiple virtual machines on the host machine. In some embodiments, the hypervisor allocates to each VM both a periodic time slice on the host's CPU and a portion the host's main memory.

As used herein, the term "virtual machine" (VM) (which is also known as a guest or a guest machine) is intended to include within its scope any meaning of that term as would be understood by a person of ordinary skill in the field. In some embodiments of the invention, a VM is a software implementation, replication, or emulation of a physical computing device that mimics functionality of the physical computing device on a host computing machine. In some embodiments, a VM executes one or more applications on an operating system generally the same as the physical computing device the VM emulates would do. In some embodiments, a VM can comprise an identification of an operating system and one or more applications, and the VM can execute the defined applications on the defined operating system. As such, multiple VMs each executing a different application on a different operating system can operate on a single host computing machine. A VM can comprise software that can be stored and executed on the host machine and/or one or more image files that define the VM (e.g., identify an operating system and one or more application programs) sufficiently for a hypervisor to create, host, and/or manage the VM on the host machine.

Some embodiments of the present invention disclose a process capable of facilitating network communication via a directly accessible network interface controller ("NIC") in a virtualized environment. The process, in some embodiment, are able to receive a packet stream traveling from a virtual machine ("VM") to a direct-access configured NIC ("DCN"). After forwarding from an embedded switch ("eSwitch") of the DCN to a virtual switch ("vSwitch") residing in a hypervisor in accordance with at least a portion of content of the packet stream, a processed packet stream is generated by the hypervisor in response to the packet stream. The processed packet stream is subsequently transmitted from the vSwitch to the eSwitch for facilitating the processed packet stream to reach its destination.

FIG. 1 is a block diagram 100 illustrating an exemplary system containing various virtual machines ("VMs") capable of communicating with remote systems and nodes via virtual and/or physical network interface controllers ("NICs") in accordance with some embodiments of the present invention. Diagram 100 includes host computing machine (a.k.a. "host") 102, nodes 108-112, and a communication network(s) 106. Nodes 108-112 can be remotely located from host 102 and capable of creating, receiving, and/or transmitting information over a communication channel such as network(s) 106. One or more of nodes 108-112 can be a VM on a host (not shown), a physical computing device (not shown), or the like. It should be noted that the underlying concept of the exemplary embodiment(s) of the present invention would not change if one or more blocks (or devices) were added to or removed from diagram 100.

Host computing machine ("host") 102, in one example, includes VMs 120-122 (two are shown but there can be fewer or more), direct-access configured NIC ("DCN") 126, and hypervisor 124. As noted above, host 102 is a physical computing machine. As also described above, each VM 120, 122 can be a software implementation of a particular computer system created and managed by hypervisor 124 on host 102. That is, each VM 120-122 can process and deliver tasks like a real physical machine. For example, each VM 120-122 can be configured to execute instructions in a way that follows an emulated computer architecture. As also described above, host 102 can comprise a central processing unit (CPU) (not shown) and a main digital memory (not shown). The hypervisor 124 can allocate to each VM 120-122 its own portion of the host's 102 main memory (not shown) and periodic slices of time on the hosts 102 CPU (not shown). Moreover, the hypervisor 124 can create and manage each VM 120-122 to execute one or more applications operating on an operating system, and the application(s) and/or operating system of one VM (e.g., 120) can be different than the application(s) and/or operating system of another VM 122 (e.g., 120). As shown, each VM 120-122 can have its own vNIC by which the VM accepts input data or outputs data.

As noted above, hypervisor 124 (which can also be known as a virtual machine monitor, virtual machine controller, or virtual machine supervisor) can be capable of facilitating and managing multiple operations in a virtualized environment. That is, hypervisor 124 facilitates and manages each VM 120-122. In some embodiments, hypervisor 124 includes vSwitch 132, overlay manager 134, and/or other functional components 136, such as, but not limited to, encryption module, decryption module, compression module, decompression module, encapsulation module, operating system emulations, load balancing module, and the like. As also noted above, a function of hypervisor 124 is to provide and manage a virtualized computing environment wherein it divides various resources of a physical computer or host such as host 102 into multiple independent VMs. For example, hypervisor 124 facilitates and emulates each VM such as VM 122 to operate or run its own operating system, process its own sets of instructions, and store results in its own memory (e.g., a portion of host's 102 memory allocated to VM 122). A function of hypervisor is thus to isolate various operations of VMs such as operations of VM 120 from operations of VM 122.

In some embodiments, vSwitch 132 is used to handle internal as well as external network interfaces and/or connections for hypervisor 124. For example, vSwitch 132 can be configured to assist hypervisor 124 to setup internal virtual ports, external virtual ports, packet size, load balance, encryption, decryption, compression, decompression, and the like. To handle the network traffic, vSwitch 132, for instance, is able to provide various network related functions, such as configuring ports for handling VLAN (virtual local area network), load balancing, failback, and failover. Depending on the applications, vSwitch 132 can be configured to fulfill requirements of virtualization.

In some embodiments, vSwitch 132 can be a layer 2 network virtual switch capable of switching data packets (e.g., IP/TCP data packets) based on packet parameters that correspond to layer 2 in the Open Systems Interconnection (OSI) model stack. For example, vSwitch 132 can switch packets based on a VLAN tag, the layer 2 (e.g., MAC) destination address and/or origination address(es), or the like of the packets. Alternatively, vSwitch 132 can operate at another layer in the OSI stack. For example, vSwitch 132 can be a layer 3 or higher virtual network appliance (e.g., a switch, bridge, router, or the like).

In one aspect, overlay manager 134 is employed to establish and manage network communication via an overlay network. The overlay network can be considered as a communication network or a computer network which is established on top of another network. For example, a secure overlay network resides on top of another existing network such as the Internet. Nodes in the overlay network are connected by virtual, physical, and/or logical links. Each link may correspond to a path which facilitates a traffic flow to travel through physical and/or logical links.

Overlay manager 134 can store rules for creating overlay network connections for particular types of outbound traffic from one or more of the VMs 120-122. For example, an overlay (e.g., a tunnel) can be created for particular types of data packets from an end point in vSwitch 132 to an end point in a destination node such as 110. As is known, the overlay can be created by encapsulating the data packets with an encapsulation header that specifies an end point at destination node (e.g., 110) as the destination for the encapsulated packet. Each overlay can thus comprise a point-to-point connection from an end point in vSwitch 132 to an end point in a remote node (e.g., 110). Virtual extensible local area network (VXLAN), generic routing encapsulation (GRE), and IP security (IPsec) are examples of encapsulation protocols for creating point-to-point overlays (or tunnels), and either of those protocols or a similar protocol can be used in hypervisor 124.

In some embodiments, vSwitch 132 creates the overlays be encapsulating outbound data packets, and vSwitch creates the overlays in accordance with rules stored in the overlay manager 134. For example, overlay rules stored in the overlay manager 134 might specify that an overlay to a particular destination node (e.g., 110) is to be created for outbound data packets having a particular characteristic. For example, such overlay rules might specify that all data packets that originate from a particular one of the VMs 120-122 are to be transported via an overlay to a particular destination node (e.g., 110). As another example, an overlay rule might specify that all data packets, regardless of the originating VM 120-122, that are destined to a particular destination node (e.g., 110) are to be transported via an overlay. As yet another example, an overlay rule might specify that all data packets carrying a particular type of data are to be transported to the destination node (e.g., 110) via an overlay. Regardless, the overlays can correspond to layer 2 in the OSI stack. Alternatively, the overlays can correspond to other layers (e.g., layer 3 or higher) in the OSI stack.

It is noted that the end point in vSwitch 132 can be the destination for an overlay created by a remote node (e.g., 110). The eSwitch 130 can thus be configured to switch encapsulated data packets (not shown) received at network interface 128 from a remote node (e.g., 110) to vSwitch 132 for decapsulation. Decapsulated packets are then returned by vSwitch 132 and forwarded by eSwitch 130 to their destination VM 120-122.

DCN 126 can be a NIC hardware interface component providing communication between a host computer and a communication network. A function of DCN 126 is to provide one or more logical interfaces between internal and external devices or components using features as interrupts, polls, and/or direct memory access ("DMA"). For example, DCN 126 may use a function of polling to check peripheral status while using an interrupt to alert the host central processing unit ("CPU") for communication. In one aspect, DCN 126 is capable of directly transferring data among VMs 120-122, local peripheral devices (not shown), hypervisor 124, and network interface 128. It should be noted that some functions of DCN 126 are configured to bypass hypervisor 124. For the forgoing and ensuing discussion, DCN 126 is a type of NIC as that term is described above.

As shown in FIG. 1, DCN 126, in some embodiments, includes eSwitch 130, network interface 128, and local interface 144.

Network interface 128 can comprise one or more ports (not shown) for connecting to network(s) 106. For example, network interface 128 can comprise one or more physical ports (e.g., Ethernet port(s)) (not shown) for connecting with one or more outside networks (e.g., 106). In some embodiments network interface 128 can also comprise one or more virtual ports (not shown) for connecting with outside network(s) (e.g., 106).

Local interface 144 can comprise one or more ports for internal connections (e.g., 142) within the host 102 and/or external connections (not shown) to local peripheral devices such as a disk drive, display, input device (e.g., keyboard, mouse, stylus), printer, and/or the like (not shown). The ports of the local interface 144 can be physical and/or virtual. It is noted that such virtual ports are sometimes referred to in the field as virtual functions.

DCN 126 is a direct access (DMA) configured NIC because each VM 120-122 is able to read and write data (e.g., data packets) directly between its allocated portion of the host's 102 main memory (not shown) and the DCN 126 without involving hypervisor 124. Thus, for example, data packets of an outbound traffic flow 162 from VM 120 can be written by VM 120 directly via one of internal connections 142 to DCN 126. The data packets can then be switched by eSwitch 130 out network interface 128 onto network(s) 106 to their destination (e.g., destination node 108) as shown in FIG. 1. Note that the foregoing bypasses hypervisor 124 including vSwitch 132. Inbound traffic (e.g., like 162 but in the opposite direction) received through network interface 128 can be switched by eSwitch 130 directly via one of internal connections 142 to VMA 120 also bypassing hypervisor 124. As will be seen, internal connections 142 can comprise an internal bus such as a peripheral component interconnect (PCI) bus or a PCI extended (PCIe, which is sometimes alternatively abbreviated PCI-X) bus.

As noted above, the foregoing DMA capability of DCN 126 allows for faster communications between VMs 120-122 and remote entities (e.g., destination nodes 108-112). The DMA capability of DCN 126, however, precludes traffic to and/or from VMs 120-122 from being processed by any of the functionality in hypervisor 124. For this reason, the local interface 144 of DCN 126 further comprises a port (not shown) and an internal connection (one of connections 142) to hypervisor 124, which as will be seen, allows eSwitch 130 selectively to switch particular traffic to vSwitch 132 for processing within hypervisor 124. As noted, hypervisor 124, including vSwitch 132, overlay manager 134, and other functionality 136, runs on host's 102 CPU (not shown), which typically provides far more processing power than, for example, any processor (not shown) on DCN 126 or any other similar component (not shown) of DCN 126. It should be noted that DCN 126 thus solves a problem that arises from operation of a computing/communications system such as illustrated in FIG. 1 and does so in a way that improves operation of the computing/communications system itself.

A function of eSwitch 130 is to provide a switching function among VMs (e.g., 120-122) operating on host 102, local devices (which can be internal as well as external and physical as well as virtual) connected to local interface 144, and external network(s) 106 connected to network interface 128.

In some embodiments, eSwitch 130 is able to facilitate direct communications among VMs 120-122 and external nodes 108-122 bypassing hypervisor 124 as discussed above. But to leverage functionalities of hypervisor 124 for certain network operations, eSwitch 130, in some embodiments, is capable of diverting certain types of network traffic to hypervisor 124 via vSwitch 132 for additional traffic processing before the traffic is forwarded to its destination. For example, eSwitch 130 can receive directly from VM 122 a stream of data packets 166 addressed to destination node 110. The eSwitch 130 can determine that the packets of stream 166 are to be tunneled via an overlay point-to-point connection (as discussed above) to destination node 110 and switch the packets 166 to vSwitch 132 of hypervisor 124 for overlay encapsulation. The vSwitch 132 can then create the overlay by encapsulating the data packets as discussed above and return the now overlay-encapsulated packets 160 to vSwitch 132, which switches the encapsulated packet stream 160 through network interface 128 onto network(s) 106 and ultimately to the end point of the overlay in destination node 110.

It should be noted that host 102 can also communicate with other VMs such as VMs 154-158 hosted by server 150 connected to node or tower 112 via network(s) 106. For instance, server 150 provides a virtual environment capable of providing a set of functions operating based on one or more operating systems. The VMs are able to execute a program based on platform-independent program execution environment in accordance with the emulation of a real machine or apparatus.

In some embodiments, eSwitch 130 can be a layer 2 network virtual switch capable of switching data packets (e.g., IP/TCP data packets) based on packet parameters that correspond to layer 2 in the OSI stack. For example, eSwitch 130 can switch packets based on a VLAN tag, the layer 2 (e.g., MAC) destination and/or origination address(es), or the like of the packets. Alternatively, eSwitch 130 can operate at another layer in the OSI stack. For example, eSwitch 130 can be a layer 3 or higher virtual network appliance (e.g., a switch, bridge, router, or the like). Regardless, eSwitch 130 can also be configured to identify and switch predetermined types of data packets to hypervisor 124 for further processing generally as described above. For example, eSwitch 130 can be configured to switch data packets that meet overlay rules similar to or the same as overlay rules discussed above with respect to overlay manager 134.

In some embodiments, eSwitch 130, all or part of local interface 144, and/or all or part of network interface 128 are implemented in software, hardware, or a combination of software and hardware. For example, DCN 126 can comprise a processor (not shown) and a digital memory (not shown). The processor (not shown) can be configured to execute software stored in the digital memory (not shown) to implement all or part of the eSwitch 130, local interface 144, and/or network interface 128. Typically, any such processor in a NIC such as DCN 126 has significantly less processing power than the host's 102 CPU (not shown). Thus, the host's 102 CPU (not shown) can have many times the processing power of any processor (not shown) in DCN 126.

Referring back to FIG. 1, generally as discussed above, in an example illustrated in FIG. 1, data traffic 166 from VM 122 is to be tunneled via an overlay to an end point in destination node 110. The eSwitch 130 in DCN 126 is accordingly configured to switch data packets 166 from VM 122 to the vSwitch 132 of hypervisor 124, which encapsulates the data packets forming tunneled traffic (encapsulated data packets) 160, which can reach destination node 110 via an overlay created by the encapsulation.

In contrast, traffic 162 originating from VM 120 is not to be transported via an overlay network. Consequently, data packets of traffic 162 are switched by eSwitch 130 through network interface 128 onto network(s) 106 over which the packets 162 travel to destination node 108. Packets 162 thus bypass hypervisor 124. Thus, eSwitch 130 can be programmed to switch some types of traffic to the hypervisor 124 for processing (e.g., overlay processing) while causing other types of traffic to bypass hypervisor 124.

Thus, as described above, in an exemplary operation, a flow of packets in traffic 166 originating from VM 122 and requiring a tunnel overlay flows directly from VM 122 to DCN 126. Upon detecting the requirement of a tunneling overlay, eSwitch 130 switches or retransmits the flow of packets 166 to vSwitch 132 of hypervisor 124, which encapsulates the packets 166 to produce encapsulated packets 160 according to overlay rules stored in overlay manager 134. The vSwitch 132 then sends the encapsulated packets 160 back to eSwitch 130, which switches the encapsulated packets 160 through the DCN's 126 network interface 128 onto network(s) 106. The encapsulated packets 160 then make their way via the overlay across the network(s) 106 to their destination, which in the example illustrated in FIG. 1, is destination node 110. In contrast, traffic 162 originating from VM 120 is not to be output via an overlay. Thus, after receiving traffic 162 directly from VM 120, eSwitch 130 in DCN 126 switches the packets of traffic 162 directly to network interface 128 (bypassing the hypervisor 124) from which packets of traffic 162 travel across network(s) 106 to their destination, destination node 108.

Although only examples of traffic flows 166/160 and 162 from a VM 120-122 to a remote destination node 108-110 are illustrated in FIG. 1, traffic flows in the opposite direction can be handled in essentially reverse order. For example, when packets of data traffic (not shown) are received through network interface 128 at eSwitch 130, eSwitch 130 can determine whether the packets are to be processed by a module of hypervisor 124 and, if not, switch the packets through internal interface 144 to the packet's destination (e.g., VM 120 in the example of a reverse flow of traffic 162). If, however, eSwitch 130 determines that the packets are to be processed by hypervisor 124, eSwitch 130 switches the packets to vSwitch 132 in hypervisor 124. The hypervisor 124 then processes the packets and returns the processed packets to eSwitch 130, which switches the processed packets through the internal interface 144 to their proper destination.

The eSwitch 130 can be configured generally similar to configurations discussed above identifying certain outbound traffic for processing by hypervisor 124. Thus, for example, a similar process in a reverse order for traffic flowing opposite to traffic 166/160 (not shown) can be carried out as follows for packets traveling from node 110 to VM 122. A packet flow from destination node 110 to VM 122 can be encapsulated for an overlay from an end point in destination node 110 to an end point in vSwitch 132. After such packets arrive over network(s) 106 at DCN 126, eSwitch 130 switches the packets to their encapsulation destination, namely, vSwitch 132. In one embodiment, vSwitch 132 is capable of decapsulating the packet flow and revealing or restoring the original packet flow addressed to VM 122. Upon decapsulating, vSwitch 132 sends the decapsulated packet flow back to eSwitch 130, which subsequently switches the packet flow to its destination, namely, VM 122.

It should be noted that, depending on the applications, certain packets or flows can thus be programmed to directly reach their destinations without the assistance of hypervisor 124. For example, transmission between VM 120 and physical NIC 128 can be programmed with bypassing options. For instance, the traffic from VM 120 which does not require tunneling to reach its destination can bypass hypervisor 124 and travel directly to its destination node (e.g., 108).

An advantage of using DCN 126 for data or traffic transmission is that DCN is able to enhance traffic processing and transmission efficiency by leveraging computing powers in both eSwitch 130 as well as vSwitch 132.

Figure 2:
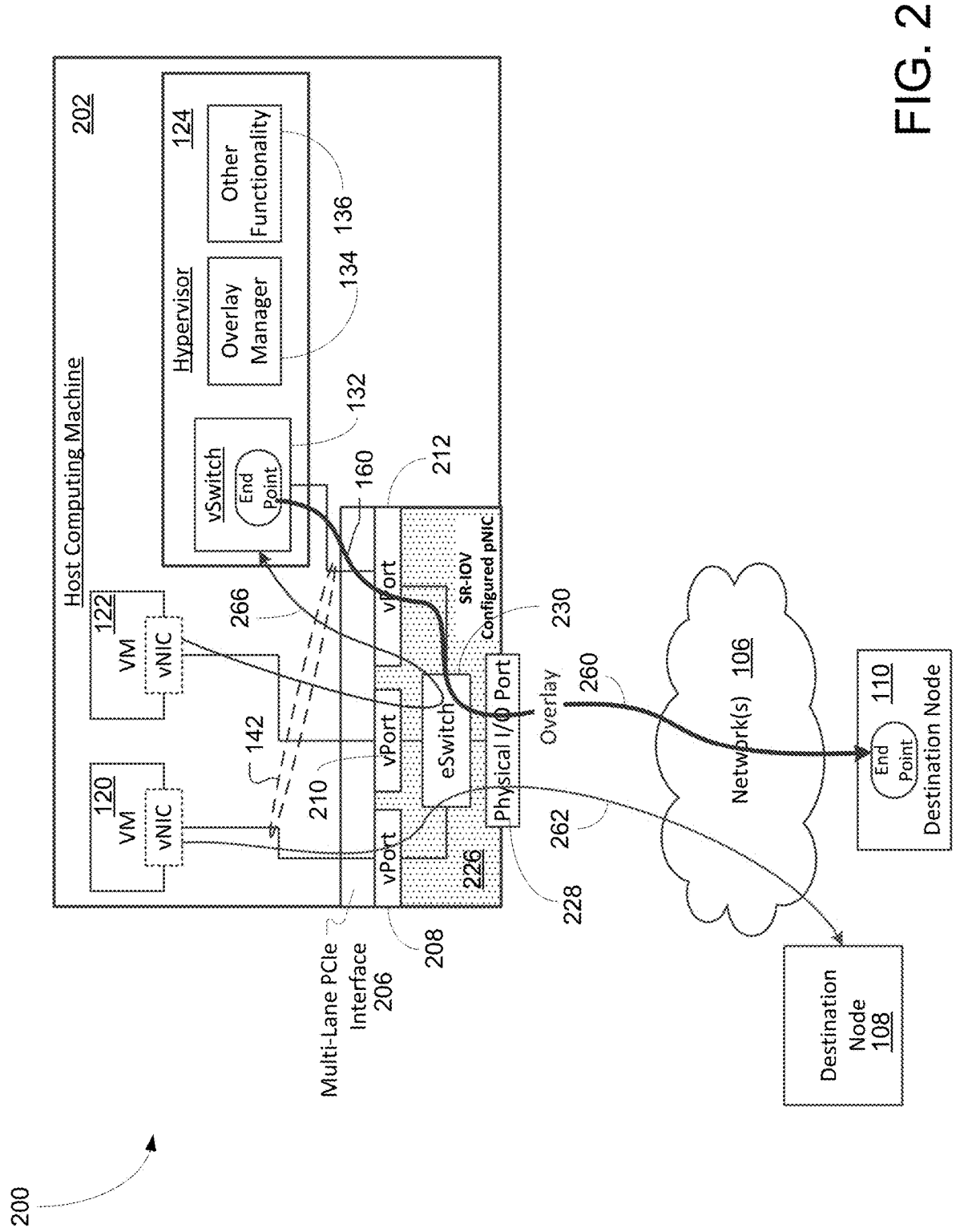
FIG. 2 is a block diagram illustrating an exemplary system providing a virtualized environment including a direct-access configured NIC ("DCN") in accordance with some embodiments of the present invention.

FIG. 2 is a block diagram 200 illustrating an exemplary system providing a virtualized environment using DCN in accordance with some embodiments of the present invention. Diagram 200 includes a host 202, nodes 108-110, and a communication network(s) 106 wherein host system 202 further includes VMs 120-122, hypervisor 124, and DCN 226. Diagram 200 is similar to diagram 100 shown in FIG. 1 except that an example DCN 226 (which is an example configuration of DCN 126 of FIG. 1) is described in detail. For example, like numbered elements are the same in FIGS. 1 and 2. In addition, host machine 202 in FIG. 2 can be generally the same as or similar to host machine 102 in FIG. 1. Likewise, traffic labeled 260, 262, and 266 in FIG. 2 can be the same as or similar to traffic labeled, respectively, 160, 162, and 166 in FIG. 1. As will be seen, multilane PCIe interface 206 and vPorts 208-212 in FIG. 2 are an example embodiment of the internal interface 144 of FIG. 1, and physical I/O port(s) 228 are an example implementation of network interface 128 of FIG. 1. Internal connections 142 can be implemented in FIG. 2 as a PCIe bus (not shown), which can be connected directly to multi-lane PCIe interface 206. It should be noted that the underlying concept of the exemplary embodiment(s) of the present invention would not change if one or more blocks (or devices) were added to or removed from diagram 200.

Referring now to FIG. 2, DCN 226, in some embodiments, includes a multi-lane PCIe interface 206, virtual ports ("vPorts") 208-212, eSwitch 230, and physical input/output ("I/O") port(s) 228. In one example, DCN 226 is a single-root, input/output virtualization ("SR-IOV") configuration that creates and assigns a vPort for each VM including hypervisor. For example, vPort 208 is created and assigned to VM 120 and is dedicated to handle traffic between DCN 226 and VM 120. Similarly, vPort 210 is assigned to VM 122, and vPort 212 is assigned to hypervisor 124. Alternatively, one or more of vPorts 208-212 can be a physical port of DCN 226. As illustrated earlier, eSwitch 230 is configured to switch among vPorts 208-212 and physical I/O port(s) 228. Note that internal connections 142, implemented as a PCIe bus (not shown), can provide direct access to/from each VM via its assigned vPort.

In some embodiments, DCN 226 creates, assigns, and dedicates a vPort such as vPort 212 to hypervisor 124. As mentioned, one or more of vPorts 208-212 can instead by a physical port. Thus, vPort 212 can alternatively be a physical port of the DCN 226, which can thus alternatively assign a physical port to hypervisor 124. Multi-lane PCIe interface 206 is also capable of providing direct access between hypervisor 124 and DCN 226. In operation, VM 122, for example, sends packets 266 addressed to destination node 110 directly through vPort 210 to eSwitch 230, which is configured to switch traffic 266 to vSwitch 132 via vPort 212. In one aspect, vSwitch 132 encapsulates packets 266 for establishing an overlay packet flow for transmitting to destination node 110. After encapsulation, vSwitch 132 switches encapsulated packets 260 through vPort 212 back to DCN 226, and eSwitch 230 subsequently forwards encapsulated packets 260 to their destination node 110 through physical I/O port 228.

Otherwise, traffic 266/260 in FIG. 2 as well as reverse traffic flows can be processed generally the same as or similar to traffic 166/160 as described above with respect to FIG. 1. Similarly, traffic 262 in FIG. 2 as well as reverse traffic flows can be processed generally the same as or similar to traffic 162 as described above with respect to FIG. 1.

SR-IOV configured DCN 226, in one aspect, employs a switch module such as eSwitch 230 to access additional computing power at hypervisor 124 based on a set of predefined conditions and/or rules. While bypassing hypervisor 124 and directly accessing external network(s) 106 is a possible application, leveraging hypervisor 124 functions such as overlaying and encrypting can be more desirable for certain types of applications. In one aspect, vSwitch 132 is more versatile and/or has higher capacity and bandwidth and/or higher computing power than eSwitch 230. Using both eSwitch and vSwitch for traffic processing can improve overall system efficiency.

Figure 3:
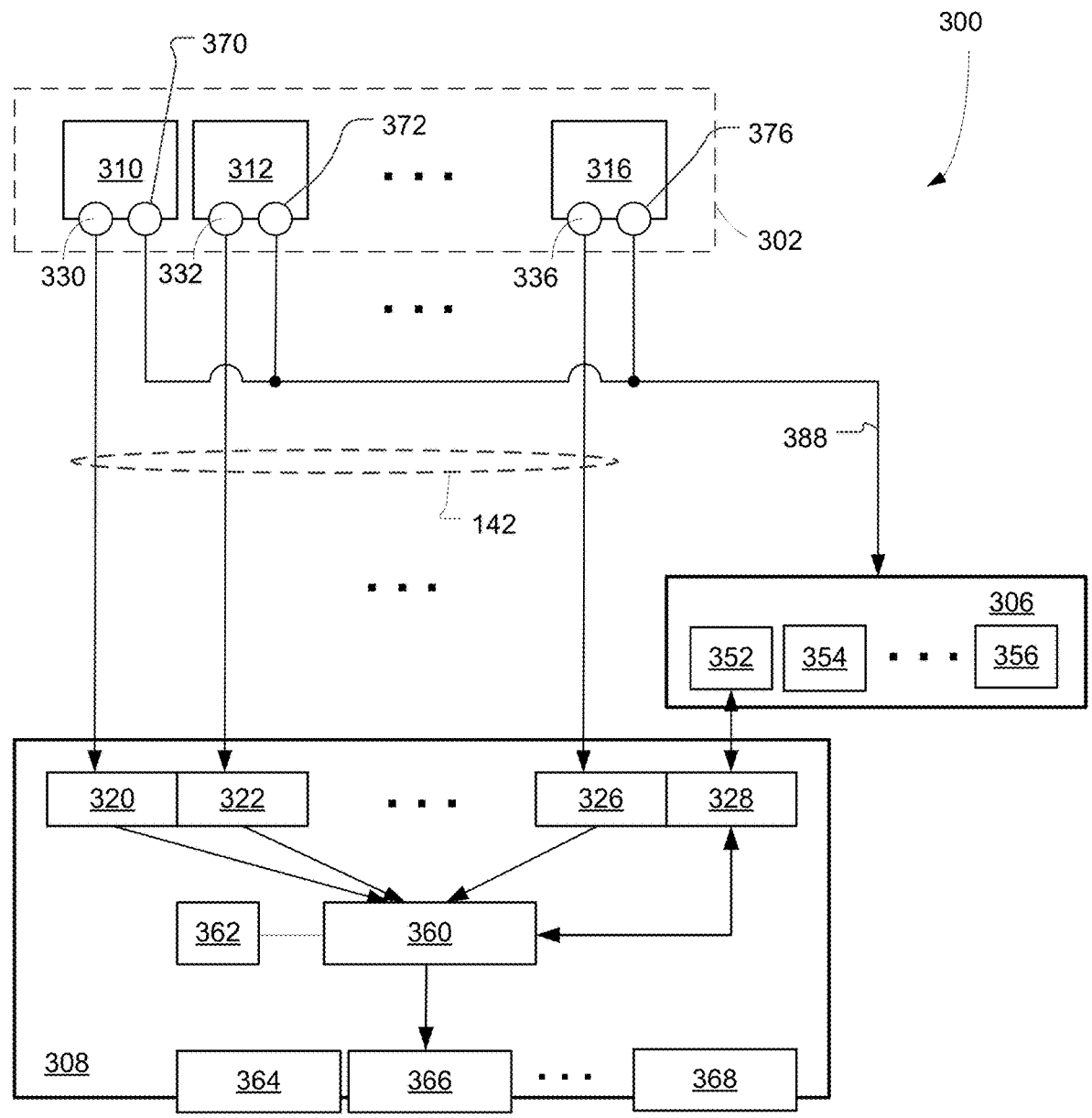
FIG. 3 is a block diagram illustrating a DCN containing an embedded switch ("eSwitch") configured to allocate various virtual ports including a dedicated virtual port for communicating with hypervisor in accordance with some embodiments of the present invention.

FIG. 3 is a block diagram 300 illustrating a DCN 308 comprising an eSwitch 360 configured to allocate various virtual ports including a dedicated virtual port for hypervisor in accordance with some embodiments of the present invention. Diagram 300 includes a group of VMs 302, hypervisor 306, and DCN 308, wherein the group of VMs 302 includes multiple VMs 310-316. Each VM, in one example, is provisioned or configured to have one or more virtual interfaces. For example, VM 310 can include virtual interfaces 330 and 370. Similarly, VM 312 includes virtual interfaces 332 and 372 while VM 316 includes virtual interfaces 336 and 376. In one example, virtual interfaces 330-336 are configured as vNICs used for coupling to DCN 308 while virtual interfaces 370-376 are used for other interfaces such as communicating with hypervisor 306 vis connection 368. It should be noted that the underlying concept of the exemplary embodiment(s) of the present invention would not change if one or more blocks (or devices) were added to or removed from diagram 300.

It is noted that elements in FIG. 3 can be the same as or similar to like named counterpart elements in FIG. 1 or 2. It is also noted that, in some embodiments, there are no interfaces (e.g., 370, 372, 376) with a direct connection (e.g., 388) from VMs 302 to hypervisor 306.

Hypervisor 306 includes a vSwitch 352, overlay manager 354, and other various functional components 356 for managing and monitoring the virtualized environment. In one aspect, 356 can include functional components, such as, but not limited to, encryption module, decryption module, compression module, decompression module, encapsulation module, operating system emulations, and the like. In addition to switching between virtualized interfaces and/or ports, vSwitch 352 can also be configured to handle traffic processing related functions, such as load balancing, facilitating encapsulation, identifying destinations, and the like.

DCN 308 includes an eSwitch 360, multiple vPorts 320-328, one or more physical I/O Ports 364-368, and database 362. Database 362, in some embodiments, stores a set of predefined conditions and/or rules regarding which type of traffic needs to be redirected to hypervisor 306 for additional processing and which type of traffic can be transmitted directly to external devices without assistance of hypervisor 306. In one aspect, database 362 includes a lookup table which can provide a fast retrieval time suitable for real-time operation in a virtualized environment.

DCN 308, in some embodiments, establishes one vPort per one vNIC of VMs 302 for facilitating packets transmissions. For example, vPort 320 of DCN 308, coupled to vNIC 330, is established and assigned to VM 310 as specifically dedicated to communication between VM 310 and DCN 308. Similarly, vPort 322 is coupled to vNIC 332 for interface between DCN 308 and VM 312, and vPort 326 is coupled to vNIC 336 for communicating with VM 316. In one aspect, DCN 308 establishes and assigns a dedicated vPort 328 to hypervisor 306. For example, eSwitch 360 is able to communicate with vSwitch 352 in hypervisor 306 via vPort 328. In one aspect, DCN 308 includes multiple I/O network ports 364-368, which can all be physical ports. Alternatively, one or more of I/O network ports 364-368 can be virtual network ports. Regardless, DCN 308 can be configured as an SR-IOV DCN. Alternatively, DCN 308 can be configured as a multi-root I/O virtualization ("MR-IOV") DCN. For example, more than one of ports 320-322 can be physical ports.

Diagram 300 illustrates a system configured to host a virtual computing environment for data communication wherein the system includes VMs 302, hypervisor 306, and DCN 308. VMs 302 are configured to emulate multiple individual computers capable of executing instructions independently from each other. In one example, each of the VMs includes a vNIC capable of directly accessing to a physical I/O port for external network connections. Hypervisor 306 is configured to have vSwitch 352 and overlay manager 354 able to generate point-to-point connections.

DCN 308 contains eSwitch 360 which is able to forward data packets to vSwitch 352 via virtual port 328 for accessing one or more processing capabilities offered by hypervisor 306. In one aspect, DCN 308 includes multiple vPorts 320-326 configured to couple to VMs 302 for transporting information, and a virtual switch port 328 coupled to vSwitch 352 for accessing hypervisor functions. DCN 308, having at least one physical I/O port capable of interfacing with the external network, is a SR-IOV capable of dedicating one virtual port such as vPort 328 for communication between vSwitch 352 and eSwitch 360. Alternatively, DCN 308, having multiple physical I/O ports, is a MR-IOV capable of dedicating one virtual port for communication between vSwitch 352 and eSwitch 360.

In one example, eSwitch 360 is able to redirect packets from a VM to vSwitch 352 via a dedicated vPort 328 for load balance between eSwitch 360 and vSwitch 352 based on a lookup database such as database 362. The physical I/O port such as I/O port 364 coupled to DCN 308 enables a connection between a peripheral component interconnect express ("PCIe") with I/O ports 364 for external network connections.

Figure 4:
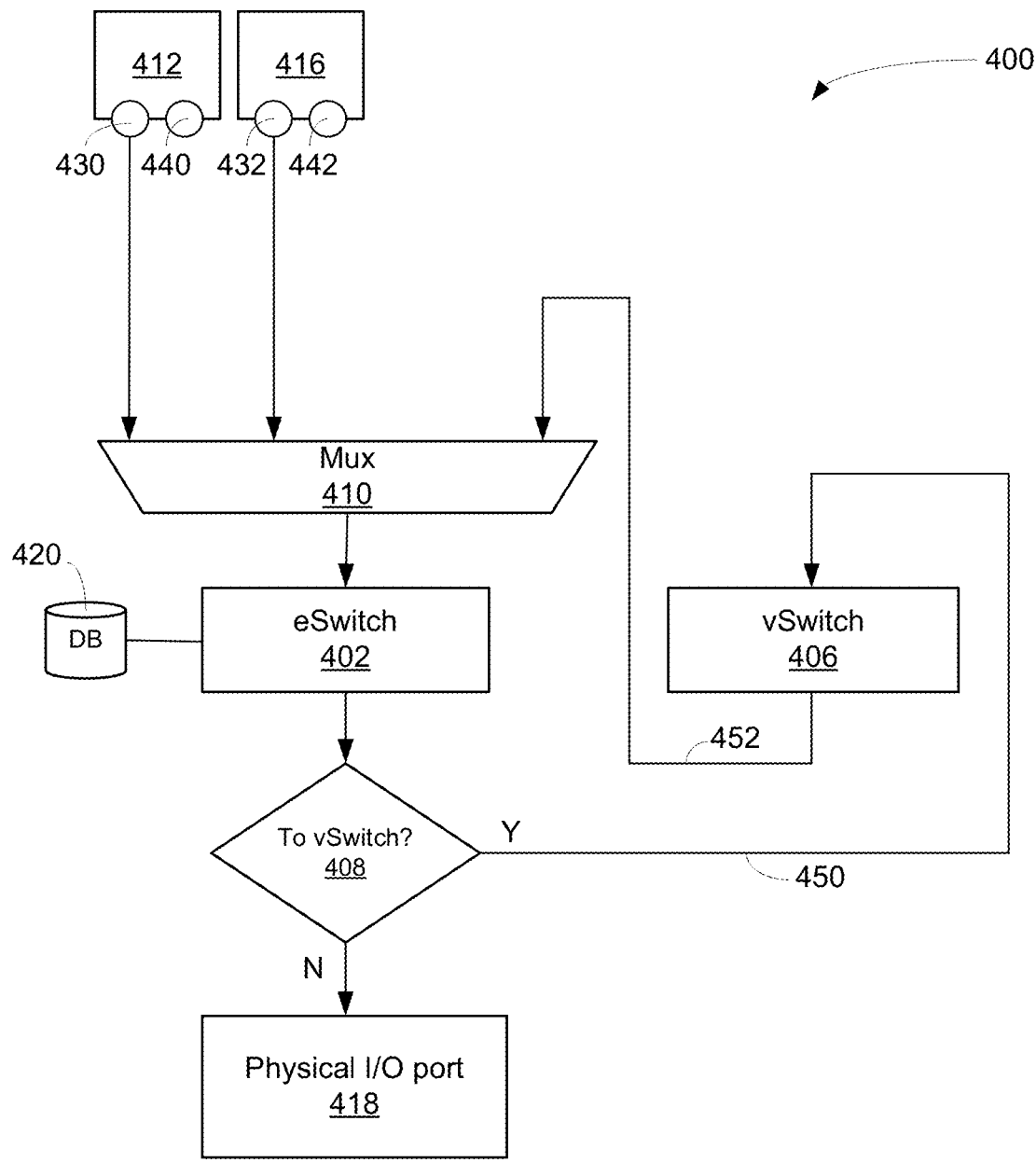
FIG. 4 is a block diagram illustrating a logic flow diagram showing a hybrid switching operation using both eSwitch and vSwitch in accordance with some embodiments of the present invention.

FIG. 4 is a block diagram 400 illustrating a logic flow diagram showing a hybrid switching operation using both eSwitch and vSwitch in accordance with some embodiments of the present invention. Diagram 400 includes VMs 412-416, eSwitch 402, vSwitch 406, and physical I/O port 418. In one aspect, eSwitch 402 and vSwitch 406 are coupled via blocks 408-410. It should be noted that the underlying concept of the exemplary embodiment(s) of the present invention would not change if one or more blocks (or devices) were added to or removed from diagram 400.

During an operation, block 410, which can be a multiplexer ("Mux") able to select one out of multiple inputs, is capable of receiving packet flows from VMs 412-416 and/or vSwitch 406 via connections 452-456, respectively. It should be noted that each of VMs contains multiple virtual interfaces such as virtual interfaces 430-432 used for coupling to Mux 410 as well as other components such as a hypervisor. In addition, Mux 410 can also receive packet flows from vSwitch 406 via connection 452. Upon reaching to eSwitch 402, the packet flow is processed and examined based on the information and/or conditions stored in DB 420 regarding whether the packet flow should be forwarded to vSwitch 406 for additional packet processing. Upon determining that the packet flow is to be forwarded to vSwitch 406 at block 408, the packet flow travels to vSwitch 406 via connection 450. Otherwise, the packet flow is passed onto block 418 to its I/O port if the packet flow does not need to be retransmitted to vSwitch 406. Once the packet flow is processed such as encapsulated for overlay transmission, the processed packet flow is forwarded from vSwitch 406 to Mux 410 which will pass it to eSwitch 402 for external network access.

It should be noted that information or conditions stored in DB 420 can be predefined and installed. Alternatively, the conditions in DB 420 can be real-time conditions. For example, the conditions include, but not limited to, load balance, compression, decompression, encryption, decryption, encapsulation, traffic congestion, bandwidth adjustment, and the like. In a scenario of predefined condition(s), a condition such as always retransmitting to vSwitch 406 for any packet flow(s) originated from VM 412. In a scenario of real-time condition(s), a condition, such as retransmitting the packets to vSwitch 406 if eSwitch 402 is busy, can be adjusted in real-time.

Embodiments of the present invention include various processing steps, examples of which will be described below. Steps of aspects of embodiments of the invention may be embodied in machine, router, or computer executable instructions. The instructions can be used to create a general purpose or special purpose system, which is programmed with the instructions, to perform steps of aspects of embodiments of the present invention. Alternatively, steps of aspects of embodiments of the present invention may be performed by specific hardware components that contain hard-wired logic for performing the steps, or by any combination of programmed computer components and custom hardware components. In the descriptions of flowcharts 500 and 600 of FIGS. 5 and 6 below, like named elements of any of the systems illustrated in FIGS. 1-4 can perform all or part of one or more blocks of flowcharts 500 or 600, for example, in any manner described above with respect to that element.

Figure 5:
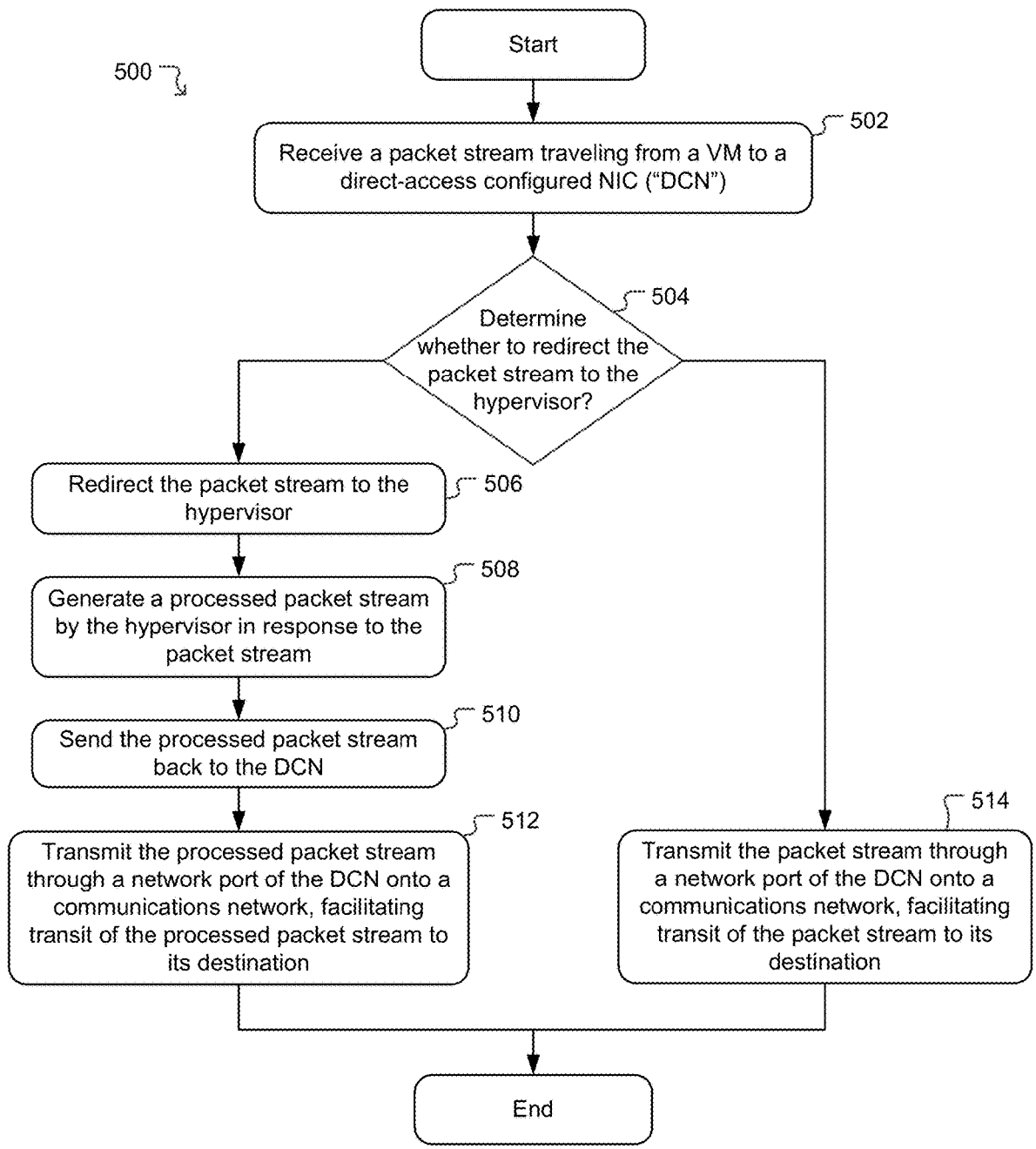
FIG. 5 is a flowchart illustrating an exemplary process of retransmitting and/or forwarding traffic or packet flows from eSwitch to vSwitch for packet processing in accordance with some embodiments of the present invention.

FIG. 5 is a flowchart 500 illustrating an exemplary process of redirecting and/or forwarding traffic or packet flows from an eSwitch in a DCN to a vSwitch in a hypervisor for packet processing in accordance with some embodiments of the present invention. At block 502, a process 500 for facilitating network communication via a DCN of a host on which a hypervisor is supervising operation of one or more VMs includes receiving a first packet stream traveling from a first VM to the DCN. For example, a first data stream or packet flow is transmitted or forwarded from a first VM through its vNIC to a first port (e.g., a virtual port) of the DCN. The transmission can be via a direct-memory-configuration so that the transmission is directly (e.g., bypassing the hypervisor) from the first VM to the DCN. The packets of the first data stream can originate from the first VM and be addressed to a remote network node.

At block 504, the process 500 determines whether to redirect the packet stream to the hypervisor, e.g., for processing within the hypervisor. This can be performed by an eSwitch in the DCN in any manner discussed above. In some embodiments, the eSwitch is configured to switch certain types of data packets to the hypervisor.

If the determination at block 504 is affirmative, the process 500 branches to block 506, where the eSwitch redirects the first packet stream to a vSwitch in a hypervisor in accordance with at least a portion of content of the first packet stream. Upon determining at block 506 that the first packet stream should be redirected to the vSwitch, e.g., based on information in the first packet stream, the first packet stream is switched by the eSwitch to the vSwitch via a port (which can be virtual or physical) dedicated for transmissions between the DCN and the hypervisor.

At block 508, a first processed packet stream is generated by the hypervisor in response to the first packet stream. For example, the first packet stream is processed, encapsulated, and/or reformatted into a processed or encapsulated packet stream in accordance with an overlay protocol capable of facilitating a transmission of the packet stream to the remote node at least in part via an overlay network.

At block 510, the first processed packet stream is returned from the vSwitch of the hypervisor to the eSwitch of the DCN. For example, the first processed packet stream is forwarded from the hypervisor to the DCN via the port (which can be virtual or physical) designated for facilitating interface between the hypervisor and the DCN.

At block 512, the process 500 sends the first processed packet stream through a network port of the DCN onto network(s) to which the remote destination node is connected. For example, the eSwitch switches the first processed packet stream received from the vSwitch through a physical I/O port that couples the DCN to a communication network(s) to which the destination node is connected.

If the determination at block 504 is negative, the process 500 branches to block 514, where the process 500 sends the first packet stream received at block 502 through the network port of the DCN onto the network(s) to which the remote destination node is connected. Block 514 can be generally the same as block 512 except, at block 514, the first packet stream as received directly from the VM at block 502 (as opposed to a processed version of the first packet stream as processed by the hypervisor (e.g., at block 508)) is sent onto the network(s) to which the destination node is connected. It is noted that, in some embodiments, blocks 504 and 506 or 514 can be performed by a single switching operation of the eSwitch in the DCN. Block 510 can comprise a switching operation of the vSwitch in the hypervisor, and block 512 can comprising a switching operation of the eSwitch in the DCN.

Figure 6:
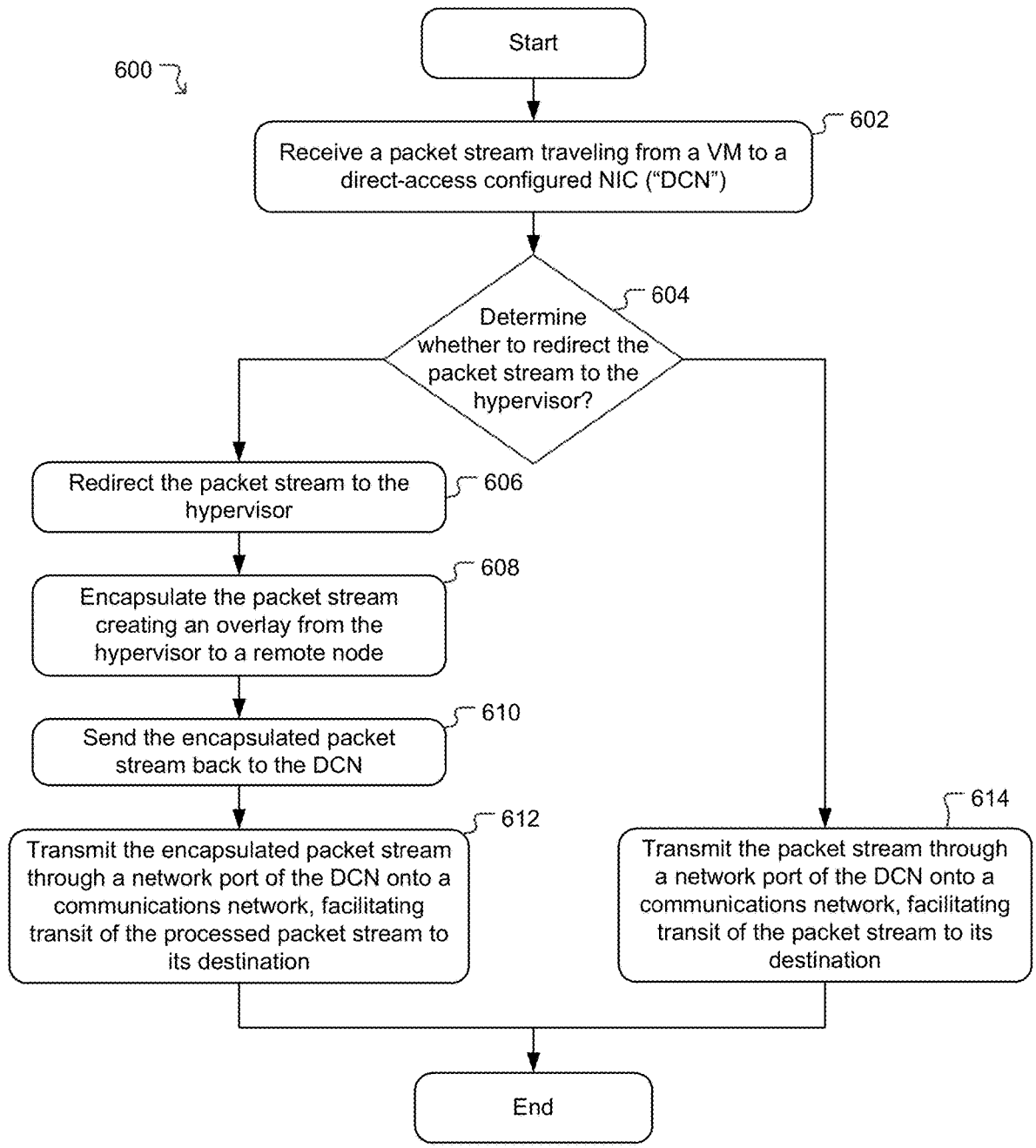
FIG. 6 is a flowchart illustrating an exemplary process of forwarding traffic from vSwitch to eSwitch for packet transmission in accordance with some embodiments of the present invention.

FIG. 6 illustrates a process 600 in which processing at the hypervisor encapsulates data packets of the packet stream, creating an overlay by which the packet stream is transported to the destination node. Generally speaking, blocks 602-614 of FIG. 6 can be the same as or similar to blocks 502-514 of FIG. 5 with the following exceptions.

At block 604, process 600 determines whether the received packet stream is to be transported over external networks to which the CDN is connected via an overlay. In some embodiments, the eSwitch in the CDN makes this determination in any way discussed above.

If the determination is affirmative, at block 606, the eSwitch switches the packet stream to the vSwitch in the hypervisor, which encapsulates, at block 608, the packet stream with an overlay (e.g., tunneling protocol) as discussed above. The vSwitch in the hypervisor then returns the now encapsulated packet stream to the eSwitch in the DCN at block 610, which switches the encapsulated packet stream through a network port of the DCN and onto the external network(s). As also discussed above, the encapsulated packet stream is routed across the external network(s) via the overlay (e.g., tunnel) to its destination.

If, however, the determination is negative at block 604, at block 614, the eSwitch switches the packet stream through a network port of the DCN and onto the external network(s). As also discussed above, the packet stream is routed across the external network(s) to its destination.

Figure 7:
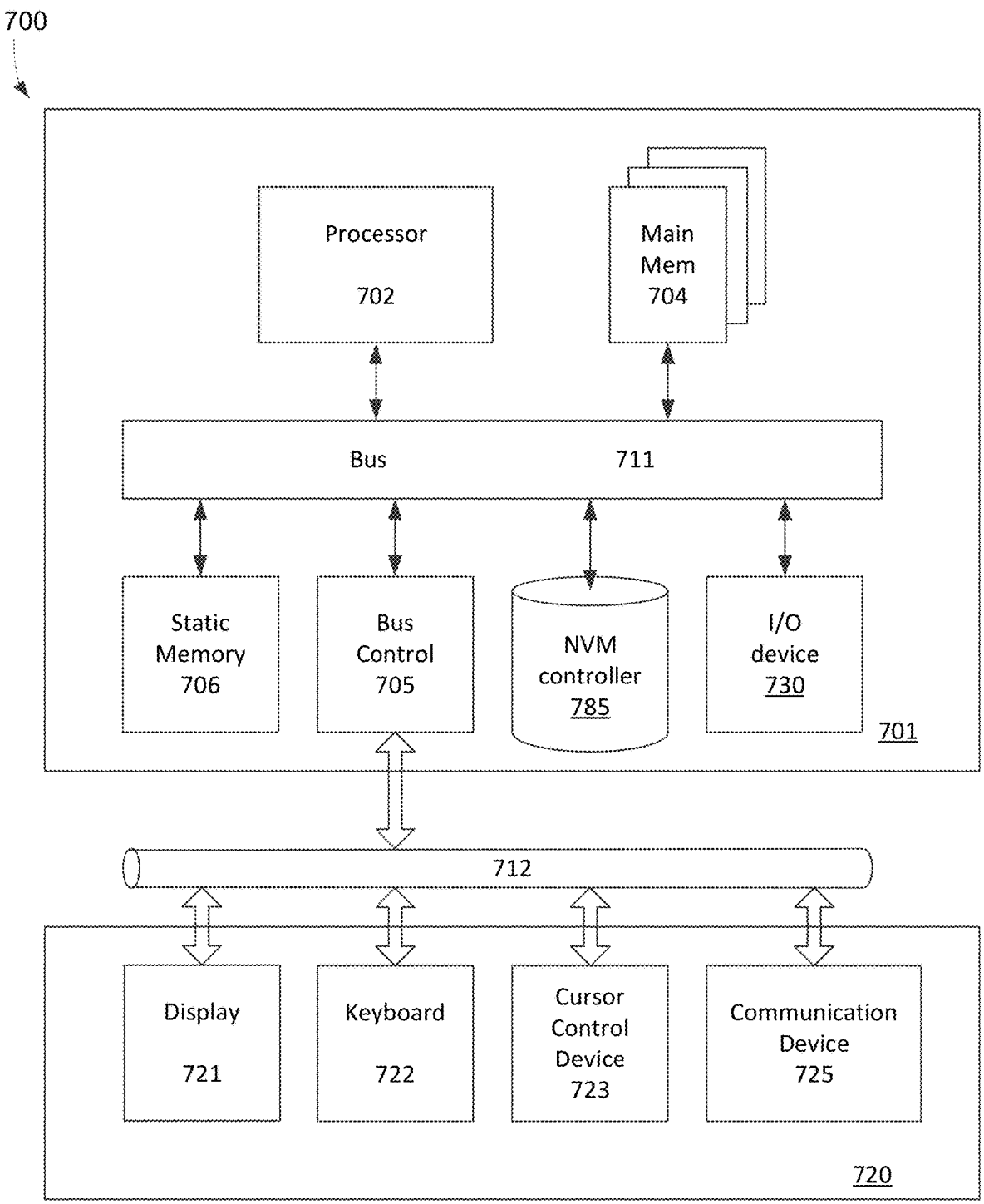
FIG. 7 is a block diagram illustrating an exemplary computer system, host machine, VM, NIC and/or switching module(s) capable of providing and facilitating a virtualized environment and/or a virtualized network in accordance with some embodiments of the present invention.

FIG. 7 is a block diagram illustrating an exemplary computer system, host machine, NIC and/or switching module(s) 700 capable of providing and facilitating a virtualized environment and/or a virtualized network on which a hypervisor can operate to create and/or control VMs in accordance with some embodiments of the present invention. To simplify forgoing discussion, the term "system" is used to refer to terms as computer system, host, host machine, VM, NIC, switching module(s), and the like. System 700, for example, includes a processing unit 701, interface bus 711, and I/O unit 720. Processing unit 701 includes a processor 702, main memory 704, system bus 711, static memory device 706, bus control unit 705, and VM controller 785 for facilitating virtualized operations. It should be noted that the underlying concept of the exemplary embodiment(s) of the present invention would not change if one or more blocks (circuit or elements) were added to or removed from diagram 700.

Bus 711 is used to transmit information between various components and processor 702 for data processing. Processor 702 may be any one of a wide variety of general-purpose processors, embedded processors, or microprocessors, such as ARM® embedded processors, Intel® Core™ Duo, Core™ Quad, Xeon®, Pentium™ microprocessor, Motorola™ 68040, AMD® family processors, or Power PC™ microprocessor. A function of processor 702 is able to execute instructions based on instruction sets stored in memory 704.

Main memory 704, which may include multiple levels of cache memories, stores frequently used data and instructions. Main memory 704 may be RAM (random access memory), MRAM (magnetic RAM), or flash memory. Static memory 706 may be a ROM (read-only memory), which is coupled to bus 711, for storing static information and/or instructions. Bus control unit 705 is coupled to buses 711-712 and controls which component, such as main memory 704 or processor 702, can use the bus. Bus control unit 705 manages the communications between bus 711 and bus 712. Mass storage memory 706, which may be a magnetic disk, optical disk, hard disk drive, floppy disk, CD-ROM, solid state drive ("SSD"), and/or flash memories, are used for storing large amounts of data.

I/O unit 720, in one example, includes a display 721, keyboard 722, cursor control device 723, and communication device 725. Display device 721 may be a liquid crystal device, cathode ray tube ("CRT"), touch-screen display, or other suitable display device. Keyboard 722 may be a conventional alphanumeric input device for communicating information between computer system 700 and computer operator(s). Another type of user input device is cursor control device 723, such as a conventional mouse, touch mouse, trackball, or other type of cursor for communicating information between system 700 and user(s).

Communication device 725 is coupled to bus 711 for accessing information from remote computers or servers through a wide-area communication network. Communication device 725 may include a modem, network interface device, and/or other similar devices that facilitate communication between computer 700 and external network or devices.

While particular embodiments of the present invention have been shown and described, changes and modifications may be made.

What is claimed is:

1. A method for facilitating network communication via a network interface controller ("NIC"), comprising:
    receiving by an embedded switch ("eSwitch") of a direct-access configured NIC ("DCN") a first packet stream traveling from a first virtual machine ("VM") to the DCN for traveling to its destination;
    forwarding the first packet stream from the eSwitch a hypervisor via a virtual switch ("vSwitch") of the hypervisor for overlay encapsulation in accordance with at least a portion of content of the first packet stream;
    generating a first processed packet stream based on the overlay encapsulation enabling a point-to-point connection by the hypervisor in response to the first packet stream; and
    transmitting the first processed packet stream from the vSwitch of the hypervisor to the eSwitch for facilitating transmission of the first processed packet stream to its destination.

2. The method of claim 1, further comprising routing the first processed packet stream from the eSwitch to a first destination node through a physical input and output ("I/O") port of the DCN coupling to a communication network.

3. The method of claim 1, further comprising:
    receiving a second packet stream traveling from a second VM to the DCN; and
    forwarding the second packet stream from the eSwitch of the DCN to the vSwitch in accordance with at least a portion of content of the second packet stream.

4. The method of claim 3, further comprising:
    generating a second processed packet stream by the hypervisor in response to the second packet stream; and
    transmitting the second processed packet stream from the vSwitch to the eSwitch for facilitating transmission of the second processed packet stream.

5. The method of claim 1, wherein receiving by an embedded switch ("eSwitch") of a direct-access configured NIC ("DCN") the first packet stream includes transmitting at least a portion of the first packet stream from a virtual NIC of the first VM to a first virtual port of the DCN.

6. The method of claim 1, wherein forwarding the first packet stream from the eSwitch to a hypervisor includes transmitting at least a portion of the first packet stream to the hypervisor containing an overlay manager.

7. The method of claim 6, wherein transmitting the first processed packet stream includes identifying whether any portion of the first packet stream is required to be retransmitted to the vSwitch based on information in the first packet stream.

8. The method of claim 7, wherein forwarding the first packet stream includes forwarding the first packet stream from eSwitch to the vSwitch of hypervisor via a virtual port of the DCN dedicated for facilitating interface between the DCN and the hypervisor.

9. The method of claim 1, wherein generating the first processed packet stream includes reformatting the first packet stream in accordance with an overlay protocol for transmission via an overlay network.

10. The method of claim 1, wherein transmitting the first processed packet stream includes forwarding the first processed packet stream from the hypervisor to the DCN via a virtual port designated for facilitating interface between the hypervisor and the DCN.

11. A system configured to hosting a virtual computing environment for data communication, comprising:
    a plurality of virtual machines ("VMs") configured to emulate a plurality of individual computers capable of executing instructions independently;
    a hypervisor coupled to the plurality of VMs and configured to have a virtual switch ("vSwitch") and an overlay manager able to generate point-to-point connections via overlay encapsulations; and
    a direct-access configured network interface controller ("DCN") coupled to the plurality of VMs and configured to have an embedded switch ("eSwitch"), wherein the eSwitch is able to forward data packets back to the hypervisor through the vSwitch based on characteristic of data packets for accessing packet encapsulation capabilities offered by the hypervisor.

12. The system of claim 11, further comprising a physical input and output ("I/O") port coupled to the DCN for connecting to a peripheral component interconnect express ("PCIe") for external network connections.

13. The system of claim 11, wherein each of the plurality of VMs includes a virtual network interface controller ("vNIC") capable of directly accessing to a physical input and output ("I/O") port for external network connections.

14. The system of claim 11, wherein the hypervisor is configured to facilitate additional network functions based on interface with the eSwitch via a designated virtual port.

15. The system of claim 11, wherein the DCN includes,
a plurality of virtual ports ("vPorts") configured to couple to the plurality of VMs for transporting information;
a virtual switch port coupled to the vSwitch of the hypervisor for accessing various hypervisor functions; and
a physical input and output ("I/O") port configured to interface with external network.

16. The system of claim 15, wherein the DCN is a single-root input and output virtualization ("SR-IOV") capable of dedicating one virtual port for communication between the vSwitch and the eSwitch.

17. The system of claim 15, wherein the DCN is a multi-root input and output virtualization ("MR-IOV") capable of dedicating one virtual port for communication between the vSwitch and the eSwitch.

18. The system of claim 16, wherein the eSwitch is able to redirect packets from one of the plurality of VMs to the vSwitch via a dedicated vPort for load balance between the eSwitch and the vSwitch based on a lookup database.

19. A method for facilitating network communication via a network interface controller ("NIC"), comprising:
transmitting a packet stream from an embedded switch ("eSwitch") of a direct-access configured NIC ("DCN") to a virtual switch ("vSwitch") of hypervisor via a virtual switch port in accordance with destination of the packet stream;
reformatting the packet stream based on an overlay encapsulation by an overlay manager of hypervisor for establishing a point-to-point ("PTP") connection through an overlay network;
retransmitting reformatted packet stream from the vSwitch to the eSwitch via the virtual switch port; and
forwarding the packet stream to its destination through the overlay network via a physical input and output ("I/O") port of the DCN.

20. The method of claim 19, further comprising receiving the packet stream traveling from a virtual machine ("VM") to the DCN.

21. The method of claim 19, further comprising allocating a virtual port at the DCN for device communication dedicating interface between the eSwitch and the vSwitch.

22. The method of claim 19, further comprising identifying whether the packet stream is required to be retransmitted from the eSwitch of the DCN to the vSwitch of hypervisor in response to a set of conditions stored in a database.

* * * * *